US006914024B2

(12) United States Patent
Anderson

(10) Patent No.: US 6,914,024 B2
(45) Date of Patent: Jul. 5, 2005

(54) GLASS BEADS AND USES THEREOF

(75) Inventor: Mark T. Anderson, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 10/837,020

(22) Filed: Apr. 30, 2004

(65) Prior Publication Data

US 2004/0209756 A1 Oct. 21, 2004

Related U.S. Application Data

(62) Division of application No. 10/037,115, filed on Oct. 24, 2001, now Pat. No. 6,800,574.

(51) Int. Cl.[7] .................. C03C 12/00; C03C 12/02; C03C 4/00
(52) U.S. Cl. .................. 501/33; 501/13; 501/54; 501/55; 501/64
(58) Field of Search .................. 501/13, 33, 34, 501/53–55, 64

(56) References Cited

U.S. PATENT DOCUMENTS

| | | |
|---|---|---|
| 3,459,673 A | 8/1969 | Best et al. |
| 3,527,711 A | 9/1970 | Barber et al. |
| 4,200,445 A | 4/1980 | Bihuniak et al. |
| 4,567,030 A | 1/1986 | Yuasa et al. |
| 4,789,501 A | 12/1988 | Day et al. |
| 5,039,326 A | 8/1991 | Day et al. |
| 5,108,477 A | 4/1992 | Cornelius et al. |
| 5,516,227 A | 5/1996 | Kozak et al. |
| 5,979,185 A | 11/1999 | Blackwell et al. |
| 6,078,605 A | 6/2000 | Little et al. |
| 6,136,736 A | 10/2000 | Rajaram et al. |
| 6,245,700 B1 | 6/2001 | Budd et al. |

FOREIGN PATENT DOCUMENTS

| | | |
|---|---|---|
| EP | 0 397 568 A2 | 11/1990 |
| EP | 0 978 486 A1 | 2/2000 |
| JP | 59164650 | 9/1984 |
| JP | 63210758 | 9/1988 |
| JP | 05322810 | 12/1993 |
| JP | 7-162062 | 6/1995 |
| JP | 2000246227 | 9/2000 |
| WO | WO 00/07950 | 2/2000 |
| WO | WO 00/29886 | 5/2000 |
| WO | WO 01/40130 A1 | 6/2001 |

OTHER PUBLICATIONS

Dejneka, MRS Bulletin Nov. 1998, pp. 57–62, Transparent Oxyfluoride Glass Ceramics.
Rare Earth Doped Fiber Lasers And Amplifiers, Chapter 1, pp. 1–18, Ed. M.J.F. Digonnet, 1993, Marcel Dekker, Inc.
Inoue et al., "An approach to new glasses through phase separation", Journal of Non–Crystalline Solids 247 (1999), pp. 1–8, Published by Elsevier Science B.V.
Cai et al., "Fiber–coupled microsphere laser", Optics Letters, vol. 25, No. 19, Oct. 1, 2000, pp. 1430–1432.
Cai et al., "Highly efficient optical power transfer to whispering–gallery modes by use of a symmetrical dual–coupling configuration", Optics Letters, vol. 25, No. 4, Feb. 15, 2000, pp. 260–262.
Hayakawa et al., "Optical bistability of stimulated–emission lines in $Sm^{3+}$–doped glass microspheres", Optics Letters, vol. 26, No. 2, Jan. 15, 2001, pp. 84–86.
Knight et al., "Phase–matched excitation of whispering–gallery–mode resonances by a fiber taper", Optics Letters, vol. 22, No. 15, Aug. 1, 1997, pp. 1129–1131.
Treussart et al., "Whispering gallery mode microlaser at liquid Helium temperature", Journal of Luminescence 76&77 (1998), pp. 670–673, Published by Elsevier Science B.V.

*Primary Examiner*—Karl Group
*Assistant Examiner*—Elizabeth A. Bolden

(57) ABSTRACT

In one aspect, the invention provides glass beads and optical devices comprising the glass beads. In other aspects, the invention provides methods of making said glass beads and rapid glass screening methods that use glass beads. Glass beads of the invention comprise greater than 80 weight percent silica, active rare earth dopant, and modifying dopant. In another embodiment the glass beads comprise greater than 80 weight percent silica and at least 5 weight percent germania. In another embodiment, glass beads comprise and from about 20 to about 90 anion mole percent of non-oxide anion.

4 Claims, No Drawings

GLASS BEADS AND USES THEREOF

CROSS REFERENCE TO RELATED APPLICATIONS

This application is a divisional of U.S. application Ser. No. 10/037,115, filed Oct. 24, 2001, now U.S. Pat. No. 6,800,574, the disclosure of which is herein incorporated by reference.

FIELD OF THE INVENTION

The invention relates to glass beads for use in optical applications, devices made from such glass beads, and a method of screening glasses for use in optical devices.

BACKGROUND OF THE INVENTION

Glass beads and microspheres are known in the art and have been developed for and used in a variety of applications. Glass beads have been used in retroreflective products, as fillers, in propping and pending applications, and in optical devices. Compositions of these known beads have generally been limited to traditional glass-forming compositions, or to high refractive index compositions with favorable melting and processing behavior. For example, pavement marking beads of soda-lime-silica glass comprising about 70 percent silica are common. High refractive index beads typically comprise less silica and have substantial amounts of titania, baria, lead, or bismuth. High index pavement marking beads have been doped with rare earth elements to provide visibility-enhancing fluorescence. Beads for mechanical uses often have significant amounts of alumina or zirconia.

Beads used in optical devices have been derived from high purity optical materials such as optical fibers and laser glass. Such materials have provided the desired ultra high-Q factors, or low losses, desired for resonator devices. Accordingly, beads of this type have included pure silica beads, pure fluoride glass beads (so-called ZBLA and ZBLAN), and beads of high phosphate laser glass. For resonator applications, these glasses are sometimes doped with a low level of a rare earth agent to make them optically active. Beads made by melting the tip of an optical fiber comprise primarily pure silica or pure fluoride glass, but have a very small center region comprising additional components derived from the core region of the optical fiber.

In addition, high purity glass is essential for applications in which the glass transmits light, as in a waveguide, optical fiber, or in high-Q resonators. It is known that transition metal or rare earth impurities can strongly absorb visible and infrared light, which leads to increased optical loss in a device. For example, transition metals, such as iron, copper, and vanadium, have crystal field splitting energies in the 1–10 eV range (~1240–~125 nm) and broad absorption bands, which are deleterious in the visible and near-IR regions. The presence of iron (III) in silica, for example, can lead to an induced absorption of 130 dB/km/ppm at 1.3 μm. Similarly, rare earth ions exhibit strong, but narrow, absorption bands in the visible and IR spectra. For example, $Tb^{3+}$ in fluorozirconate induces a 150 dB/km/ppm absorption at 3.0 μm in fluorozirconate.

In addition, impurity ions can alter the local structure of a glass and lead to different crystal field environments around nearby cations. In the case of rare-earth-doped glasses, the local field dictates the lifetime and breadth of the emission spectrum. As the use of high purity glass is essential in transmission applications, for example, amplifier optical fiber, it is prudent to use high purity glasses to screen compositions in order get the most accurate information about how that glass will perform in an optical device.

In silicates, hydroxyl ions impart unwanted absorption bands at 2.75, 2.22, 1.38, 1.24, and 0.95 μm. The 1.38 μm absorption band is particularly problematic for telecommunications applications. In silicate optical fiber, the absorption results in about a 40 dB/km/ppm hydroxyl ion loss at 1.38 μm. Thus, it is desirable for telecommunications devices and waveguides to have hydroxyl concentrations less than about 1 ppm. The presence of hydroxyl ions has also been reported to decrease the excited-state lifetime of rare-earth-doped glasses. Hydroxyl ions also modify the viscosity of the glass. The log viscosity decreases about 0.0018/ppm hydroxyl ion. For example, 100 ppm hydroxyl ions in the glass decreases the viscosity of the glass by approximately 40 percent.

What is needed are homogeneous beads, processes of making, and devices comprising high purity, tailored compositions that provide non-maximal Q-factors. Such beads would be useful for broadening selected frequency bands in resonators, for photo-trimmable devices, and for screening glass compositions for making optical devices, for example, optical fibers.

SUMMARY OF THE INVENTION

In one aspect, the invention provides an optically active solid glass bead comprising greater than 80 weight percent silica, one or more active rare earth dopants, and one or more modifying dopants. The modifying dopant may be either a cationic or anionic species.

In another aspect, the invention provides a solid glass bead comprising a mixture of greater than 80 weight percent silica and at least two active rare earth dopants.

In another aspect, the invention provides a photosensitive solid glass bead that comprises greater than 80 weight percent silica and germania combined. Germania is present in the solid glass bead in an amount of at least 5 weight percent. The glass beads comprising silica and germania are photosensitive. The solid glass beads comprising silica and germania may also further comprise one or more modifying dopants.

In another aspect, the invention provides a solid glass bead that comprises from about 20 to about 90 anion mole percent of at least one non-oxide anion.

Embodiments of the glass beads of the invention may typically contain about 100 ppm of hydroxyl groups or less, or less than about 1 ppm of hydroxyl group.

The glass beads of the invention may contain a variety of levels of active rare earth and modifying dopants and contain an effective amount so to provide an optically active glass bead. The compositions of the glass beads of the invention are preferably functionally homogeneous.

In another embodiment, the invention provides a method of making solid glass beads comprising the steps of forming a solution comprising glass precursors; converting the precursors to glass precursor powder; heating the glass precursor powder in the presence of halogen gas to dehydrate the glass precursor powder; and exposing the glass precursor powder to a flame to form solid glass beads.

In another aspect, the invention provides a method of making an optical device comprising a glass composition by using solid glass beads to screen glass compositions. In one embodiment, the method of the invention comprises the steps of: providing at least one solid optically active glass bead of each of at least two glass compositions to be screened for desirable properties; exposing at least one glass bead of each of the at least two glass compositions to light; collecting emitted light from at least one glass bead of the at least two glass compositions; analyzing the emitted light; selecting a glass composition having the desired properties; and incorporating the selected glass composition into the optical device, wherein said glass composition is in a form other than a solid glass bead. The above method of the invention is not limited to the glass beads of the invention and includes any optically active glass or glass-ceramic beads.

In another aspect, the invention provides a method of altering the refractive index of a photosensitive glass bead comprising the step of exposing the glass bead to actinic radiation.

In another aspect, the invention provides a method of altering the output of an optical device comprising a glass bead comprising the step of exposing the glass bead in the optical device to actinic radiation wherein the output of the device is altered.

In another aspect, the invention provides optical devices comprising solid glass beads of the invention.

"Active rare earth dopant" means a rare earth dopant that provides light emission in response to excitation of its electrons.

"Optically active glass" generally means a glass that provides: a useful response to, modulation of, or manipulation of, incident light. Specific examples of optically active glass include, but are not limited to, glass which exhibits: fluorescence, stimulated emission, birefringence, photosensitivity, and optical nonlinearity.

"Birefringence" means different refractive indexes along different directions.

"Photosensitivity" means a change in refractive index of at least $1 \times 10^{-5}$ from exposure to light.

"Optical nonlinearity" means that the refractive index or the absorption coefficient is a function of the intensity of light.

"Functionally homogeneous" means materials that provide continuous regions of the selected compositions assessable for light propagation that are exclusive of inhomogeneous features or of regions having differing compositions. "Differing compositions" means the dopant ion concentration in any 1 micrometer cross section within the regions of the selected compositions does not vary by more than 20 percent as compared to the regions of selected composition outside the 1 micrometer region.

"Light" means electromagnetic radiation of any wavelength and includes, for example, UV, visible, infrared, x-ray, microwave, radiowave, and gamma ray.

DETAILED DESCRIPTION OF PREFERRED EMBODIMENTS

In one aspect, the invention provides glass beads that comprise greater than 80 weight percent silica, one or more active rare earth dopants, and one or more modifying dopants. These beads typically have a low concentration of hydroxyl groups, that is, less than 100 ppm hydroxyl, and in another embodiment, less than 1 ppm hydroxyl. The active rare earth dopants are used in an effective amount so to provide optical activity and may be chosen to provide desired optical adsorption and emission characteristics. The solid glass beads of this aspect may contain any combination of active rare earth and modifying dopants so long as the glass beads comprise greater than 80 weight percent silica ($SiO_2$).

In other embodiments, the glass beads comprising silica, active rare earth dopant and modifying dopant contain 80.1, 80.2, 80.3, 80.4, 80.5, 80.6, 80.7, 80.8, 80.9, 81, 82, 83, 84, 85, 86, 87, 88, 89, 90, 91, 92, 93, 94, 95, 96, 97, 98, 99 weight percent silica or greater; any fractional amount between 80 weight percent and 99.9 weight percent; and any range of whole or fractional amounts between greater than 80 weight percent and 99.9 weight percent silica.

In one embodiment, the glass beads of the invention comprising greater than 80 weight percent silica, active rare earth dopant, and modifying dopant contain at least 0.0015 cation mole percent of active rare earth dopant. In another embodiment, the glass beads may contain not more than 5 cation mole percent active rare earth dopant. In another embodiment, the glass beads may contain from about 0.0015 to about 5 cation mole percent active rare earth dopant and may contain any whole or fractional amount in between 0.0015 and 5 cation mole percent.

In one embodiment, glass beads comprising greater than 80 weight percent silica, active rare earth dopant and modifying dopant contain at least 0.02 cation and/or anion mole percent modifying dopant. In another embodiment, the glass beads of the invention contain at least 0.1 cation and/or anion mole percent modifying dopant. In another embodiment, the glass beads of the invention contain at least 1.0 cation and/or anion mole percent modifying dopant. In another embodiment, the glass beads of the invention contain at least 4 cation and/or anion mole percent modifying dopant. In another embodiment, the glass beads contain not more than 20 cation and/or anion mole percent modifying dopant. In another embodiment, the glass beads contain not more than 15 cation and/or anion mole percent modifying dopant. In other embodiments, the glass beads contain from about 0.02 to about 20 cation and or anion mole percent modifying dopant and may contain any whole or fractional amount between about 0.02 and about 20 cation and/or anion mole percent. In other embodiments, glass beads of the invention contain from about 4 to about 15 cation and/or anion mole percent modifying dopant and contain any whole or fractional amount between about 4 and about 15 cation and/or anion mole percent.

In the above glass beads of the invention, the amount of silica in the glass composition is determined by first attributing the oxygen atoms present to the silicon atoms present and then to other cations. For example, a glass sample having 95 moles of Si, 5 moles of active rare earth (RE), 190 moles of O, and 15 moles of F would be defined as having 95 moles of $SiO_2$ and 5 moles of $REF_3$. In this example, if RE is lanthanum, then approximately 85 weight percent of the glass composition is silica. In this example, the anion mole percent of F is 7.3 anion mole percent $(15/(190+15) \times 100$ percent) and the cation mole percent of La is 5.0.

In another aspect, photosensitive glass beads of the invention comprise greater than 80 weight percent silica and germania combined and contain at least 5 weight percent germania. In one embodiment, the silica concentration may range from about 60 to about 95 weight percent and may contain any whole or fractional amount between about 60 and about 95 weight percent. These glass beads may also contain from 0 to 20 anion or cation mole percent modifying dopant and any whole or fractional amount in between these ranges as long as the glass beads contain 80 weight percent silica and germania combined and contain at least 5 weight percent germania. The refractive index of the photosensitive glass beads of the invention may be altered by exposing the glass beads to actinic radiation.

In other embodiments, the silica and germania-containing glass beads of the invention contain from about 5 to about 40 weight percent germania; and from about 5 to about 30 weight percent germania and any whole or fractional amount in between 5 and 40 weight percent, with the proviso that said glass beads contain at least 80 weight percent silica and germania combined.

In another aspect, the invention provides a solid glass bead that comprises from about 20 to about 90 anion mole percent of at least one non-oxide anion. In other embodiments, these solid glass beads comprise from about 30 to about 90 or about 50 to about 90 anion mole percent non-oxide anion and any whole or fractional amount in between 20 and 90 anion mole percent. In other embodiments, glass beads of the invention comprise at lease two non-oxide anions.

The balance of the above glass bead may comprise one or more cations selected from alkali metals, alkaline earth metals, transition metals, main group metals, lanthanides, actinides, and active rare earths. In other embodiments, cations can include zirconium, barium, lanthanum, aluminum, sodium, zinc, titanium, and an active rare earth ion.

Examples of non-oxide anion containing glass beads of the invention include those made from glass compositions containing fluorides, sulfides, selenides, other halides and chalcogenides, and arsenides. Specific useful non-oxide anion containing glass beads of the invention include those containing Zr—based halides such as Zr—Ba—La—Al—Na fluoride glass, and chalcogenide glasses comprising one or more of S, Se, and Te anions with cations of Ge, As, Si, Sn, Sb, Ga, In, Bi, or P. Non-oxide anion containing glass beads of the invention include glass comprising oxygen modified halide glasses, oxygen modified chalcogenides, silicon oxy-halide glasses, and mixed oxide/chalcogenide glasses.

In this application, "active rare earth dopants" includes compounds containing cerium, praseodymium, neodymium, promethium, samarium, europium, gadolinium, terbium, dysprosium, holmium, erbium, thulium, ytterbium, and mixtures thereof. In some embodiments of the invention, the active rare earth dopants are in the form of active rare earth oxides. Oxyfluoride compositions capable of forming transparent glass ceramics are also useful non-oxide anion containing compositions. Useful glass-ceramic forming compositions are described in Dejneka, MRS Bulletin November 1998, p. 57, "Transparent Oxyfluoride Glass Ceramics."

Modifying dopants are typically used in combination with the active rare earth dopants to modify properties of glass beads. Such modifications can include, for example, increasing the solubility of the active rare earth dopants, modifying emission and absorption spectra, increasing or decreasing the refractive index of the glass bead, and modifying the physical properties of the glass.

Useful modifying dopants include compounds containing cations or anions such as non-fluorescent rare earth ions including lanthanum, yttrium, lutetium, scandium; alkaline earth metals; transition metals including titanium, zirconium, halfnium, niobium, tantalum; main group ions including gallium, indium, tin, boron, lead, phosphorous, arsenic, antimony, bismuth, nitrogen; anions such as chalcogens including sulfur, selenium, tellurium, and polonium; halides including fluorine, chlorine, bromine, iodine; aluminum, germanium, lithium, sodium, potassium, rubidium, cesium, and zinc; and combinations of any cations and anions above. The active rare earth and modifying dopants may be in the form of oxides. It is to be understood that the active rare earth compounds and modifying dopants may not be available in pure forms and may contain mixtures of elements.

Glass beads of the invention may be fabricated to provide a tailored refractive index. In general, the refractive index of a glass bead may be tailored by the addition of selected modifying dopants and/or other additives. For example, the addition of either fluoride or boron oxide will lower the refractive index of glasses comprising silica, whereas metal oxide ions such as lanthanum, yttrium, scandium, titanium, zirconium, hafnium, niobium, tantalum, aluminum, gallium, indium, germanium, tin, lead, phosphorous, arsenic, antimony, bismuth, and active rare earth ions will increase the refractive index of such silica glasses. In one embodiment, glass beads of the invention have a refractive index of less than 1.60. In another embodiment, the glass beads have a refractive index of less than 1.50. In another embodiment, glass beads of the invention have a refractive index of from about 1.40 to about 1.50 and may have a refractive index of any whole or fractional amount in between 1.40 and 1.50.

Preferably, glass beads of the invention are functionally homogeneous. Generally, functionally homogeneous beads are substantially homogeneous. However, functionally homogeneous beads may have certain inhomogeneous features. For example, glass beads having a core region and a shell region of a different glass composition behave similarly to a homogeneous glass bead having the glass composition of the shell for applications and analyses where the light propagates primarily or exclusively in the shell region. Useful glass beads of the invention are functionally homogeneous and provide continuous regions of the specified tailored compositions assessable for light propagation that are exclusive of inhomogeneous features or of regions having differing compositions.

In another embodiment, glass beads of the invention have a density or fictive temperature gradient such that the lowest fictive temperatures occur near or in the center region of the glass bead and the highest fictive temperature near the edges or surface of the glass bead such that the gradient of fictive temperature generally resembles that of an optical fiber. This characteristic typically occurs in glass beads that are rapidly quenched and unannealed when formed and is not related to a compositional gradient. Such characteristics occur because the outside of the glass bead cools more quickly than the inside which results in a less dense, lower refractive index glass at or near the glass bead surface, and a higher refractive index at or near the core of the glass bead.

Glass beads of the invention are generally made by mixing glass precursors to make a solution, converting the precursor materials to form a powder, heating the powder in the presence of halogen gas (such as chlorine) or a source of halogen gas, (for example, $SOCl_2$), exposing the resulting glass particles to a flame to form glass beads, collecting and cooling the glass beads, and then separating the beads by size.

Glass beads of the invention are generally made from, for example, high purity silica, active rare earth dopant, and modifying dopant precursors. Generally, the high purity silica precursor contains less than 1000 ppm of metal atoms or ions that are not silicon. In other embodiments, the high purity silica precursor contains less than 1000 ppm of metal atoms or ions that are not silicon and less than 100 ppm transition metals. In other embodiments, the high purity silica precursor contains less than 1000 ppm of metal atoms or ions that are not silicon and less than 1 ppm transition metals.

Useful silica precursors include alkoxysilanes, siloxanes, silicon halides, colloidal silica, soluble fluorosilicates, and mixtures thereof. Specific useful silica precursors include tetraethoxysilane, tetramethoxy silane, tetrapropoxysilane, tetrabutoxysilane, and silicon tetrachloride.

Useful active rare earth dopant precursors include active rare earth halogen salts, active rare earth nitrates, sulfates, ketonates, alkoxides, carboxylates including acetates, β-diketonates, and fluoro -β-diketonates. Specific useful active rare earth dopant precursors include nitrates and chlorides of erbium, praseodymium, thulium, neodymium, and combinations thereof.

Useful modifying dopant precursors include soluble alkoxides, nitrates, halides, carboxylate salts, sulfates, ketonates, B-diketonates, and combinations thereof, of the modifying dopant elements. Specific useful modifying dopant precursors include aluminium sec-butoxide, aluminum nitrate hydrate, lanthanum chloride hydrate, lanthanum nitrate hydrate, tetraethoxygermane, germanium chloride, boric acid, gallium nitrate hydrate, gallium (III) 2,4-pentanedionate and combinations thereof.

Generally, solutions of glass precursors are made by dissolving each of the glass precursors into an appropriate solvent for that glass precursor to make a stock solution. Portions of each of the stock solutions are then added to a silica solution to make the precursor solution for the glass beads. Useful solvents include alcohols, water, amides, polyols, nitriles, ketones, aldehydes, acetates, ethers, and combinations thereof.

Generally, the glass precursor solutions can be precipitated by increasing the pH of the solution using an appropriate base. Examples of useful bases include ammonium hydroxide, alkylammonium hydroxides, alkali metal hydroxides, amines, and the like. In other cases, for example, where one or more components are soluble in basic solution, or precipitation kinetics for different constituents are grossly different, the precursor solution can be concentrated and dried by evaporation. Such an approach works especially well for phosphosilicates, for example.

When both oxide and non-oxide compounds are used as precursors, it is sometimes desirable to first form oxide and non-oxide precipitated powders separately, and then to combine slurries, gels, or suspensions of each using, for example, high shear mixing. For example, fluoride components can be formed by adding aqueous ammonium fluoride solution to aqueous nitrate solutions of lanthanides or alkaline earths. The resulting precipitate is washed and combined with a silicate precursor solution or precipitate by mixing.

After combining a base with a glass bead precursor solution, a precipitate rapidly forms. The precipitate is typically suction filtered and washed with deionized water to yield a wet powder. The wet powder is then dried, typically at about 80–100° C. The resulting powder is calcined at a non-devitrifying temperature for a sufficient time that densifies the powder into particles and removes any residual organics. In another embodiment, the powder is exposed to a halogen gas, for example, chlorine gas during calcining, which removes the hydroxyl groups from the glass matrix. The powder is exposed to the halogen gas for enough time to allow the halogen gas to react with surface hydroxyl groups and form HCL. The exposure time is typically about 10 minutes in an oxygen/halogen atmosphere at calcining temperatures from about 900° C. to about 1300° C.

Glass precursor powder is formed into glass beads by exposing the powder to a hydrogen/oxygen flame and then cooling the resulting particles using conventional glass bead manufacturing methods. The resulting glass beads are collected, and fractioned into sizes. A typical method of making glass beads is described in U.S. Pat. No. 6,245,700 B1, incorporated by reference in this application for the method of making glass beads. Optionally, the isolated glass beads can be annealed to homogenize their structure, oxidize selected species, or create a transparent nanocrystalline glass-ceramic structure.

Glass beads containing mixed anions can be formed by pouring a melt of the desired composition into a jet of nitrogen gas while maintaining an inert atmosphere in the immediate surroundings of the glass.

Glass beads of the invention can be advantageously made so to possess similar thermal, mechanical, and optical properties to those of high silica-containing optical components or devices. For example, glass beads can be fabricated having similar melting point, viscosity, refractive index, and thermal expansion coefficient to those of optical components. For example, glass beads of the invention may comprise a glass composition of the core of an optical glass fiber. In another embodiment, glass beads of the invention are thermally processed in a manner that is similar to that of optical glass fibers during fiber drawing. For example, the melting temperature and quench rate can be similar to that of optical fibers or other optical devices.

Solid glass beads of the invention may also be used as components in optical devices. Examples of such uses include: high quality-factor resonators, low threshold rare-earth microlasers, lasers with surface-enhanced-emission at non-standard wavelengths, upconversion lasers, light sources for near-field-scanning optical microscopy, all-optical add/drop devices, components in narrow linewidth compact diode-laser sources, high sensitivity strain sensors; frequency locking in semiconductor lasers, narrow-band filters, spectrum analyzers, modulators, optoelectronic microwave oscillators, and second harmonic generators. Optical device characteristics such as resonance frequencies, bandwidths, excited-state lifetimes, Raman shifts, nonlinear coefficients, photosensitivity, and the like, can be tailored by adjusting the amount of modifying dopant in the glass beads. Resonator type devices comprising a photosensitive bead can be adjusted, tailored, or "trimmed" by exposing the bead to light or actinic radiation so as to change the refractive index of at least the surface region of the bead by a desired amount. In other optical devices comprising a glass bead, exposing the glass bead to actinic radiation can alter the intensity, direction, and/or wavelengths of the output light.

In another aspect, the invention provides a method of making optical devices through screening of at least two glass compositions in the form of glass beads. The method comprises the steps of providing one or more optically active glass beads of each of the at least two glass compositions; exposing at least one glass bead of each of the glass compositions to light; collecting and analyzing emitted light from the exposed glass beads; selecting a desired glass composition; and incorporating the selected glass composition into an optical device. The selected composition is in a form other than a glass bead. The screening step is typically repeated until a glass having the desired optical and/or physical properties is selected. Identification of glass compositions can involve interpolation or extrapolation of data derived from the at least two bead compositions.

The method provides a rapid and inexpensive way to screen glasses for use in optical devices. The method is suitable for any solid glass or glass-ceramic bead having any composition that may be useful in an optical device. For example, the glass beads of the method may comprise silica and active rare earth dopant; high refractive index glasses; fluoride and oxyfluoride glasses; chalcogenides; tellurites; or heavy metal oxide glasses.

In another embodiment of the method of the invention, the glass beads are provided by making the glass beads. The glass beads may be made by the methods described above or by any other conventional glass bead forming process.

Characterization of glass beads can be done by exposing one or more glass beads to light from a light source and then collecting and analyzing the emitted light from one or more glass beads. In one embodiment, the light source is a UV, visible, or infrared laser. Light from the light source can be delivered to the particle through any means that effects transmission of source light into the glass bead. Examples of such light delivery means include fiber pigtailing, evanescent prism coupling, single mode optical fibers, polished half-block prism couplers, hybrid fiber-prism couplers, and strip-line pedestal anti-resonate reflecting waveguides (SPARROWs).

The emitted light from the glass bead may be collected by the source light optical fiber or by another light collection means to measure the optical properties of the emitted light. Specific emitted light collection means include the light delivery means described above.

Excited state lifetimes of active rare earths can be determined by pulsing or chopping the source light and measuring the decay of the intensity of the emitted light from the glass bead. Raman shift may be measured by exposing the glass bead to light from a suitable light source and then measuring the Raman shift using any commercially available microRaman instrument Examples of useful forms of glass compositions for the device of the method above include the cores or claddings of glass optical fibers and the claddings or light carrying regions of planar or other optical waveguides. Glass compositions of the method can also comprise non-bead portions of components in optical devices. Examples of optical devices in which the screened glass compositions, in a form other than a solid glass bead, are incorporated into include: optical fibers; planar devices including: arrayed waveguide devices, splitters, couplers, filters, lasers, add/drop devices, amplifiers, gratings; spectrum analyzers; modulators; opto-electronic microwave oscillators; and second harmonic generators.

Optical device characteristics such as resonance frequencies, bandwidths, excited-state lifetimes, Raman shifts, nonlinear coefficients, photosensitivity, and the like, can be tailored by adjusting the amount of modifying dopant in the glass.

For example, if an optical fiber is desired with: (1) a simple two or three component core glass with emission at 1500 –1600 nm region; (2) an emission full width half maximum of greater than 46 nm; (3) a peak emission wavelength less than 1532 nm; (4) greater than 80 percent long-lifetime 1550 nm rare-earth emission; and (5) a minimum concentration of dopant ions, one could screen erbium-doped silicate, germanosilicate and aluminosilicate with various amounts of Ge and Al by conducting experiments similar to those described in the Examples below. If this approach were adopted, one would quickly discover that to get the desired properties an aluminosilicate glass is desirable. From Examples 10–14, one would further discover that a glass with slightly greater than 6 mole percent aluminum but less than 8 mole percent aluminum would likely satisfy all of the requirements. Another set of glass beads having an aluminum content from 6 to 8 mole percent could be screened to further refine the glass composition. Of course, once the appropriate glass composition is determined, a glass fiber or other optical instrument may be fabricated by well known methods, such as described in "Rare Earth doped fiber lasers and amplifiers" Ed. M. J. F. Digonnet, 1993, Marcel Dekker, Inc.

EXAMPLES

Glossary

"FWHM (−3 dB)" means full width half maximum of the erbium $^4I_{13/2} \rightarrow {}^4I_{15/2}$ emission peak. The FWHM value is determined by: (1) determining the wavelength at which the emission intensity is a maximum (derivative of emission intensity versus wavelength plot is zero); (2) determining the wavelengths, −3 dB right and −3 dB left, at which the emission intensity is 50 percent of that at peak (3 dB less than the intensity of the peak maximum); and (3) subtracting wavelength of the −3 dB left from the wavelength −3dB right peak.

Deionized water is water having a resistivity of at least 18 M$\Omega$.

Silica Stock Solution

Tetraethoxysilane (223 mL, available from Aldrich Chemical Company, Milwaukee Wis.); absolute ethanol (223 mL, available from Aaper Alcohol, Shelbyville, Ky.); deionized water (17.28 mL); and 0.07 N hydrochloric acid (0.71 mL) were combined in a 2-L reaction flask. The resulting transparent solution was heated to 60° C. and stirred for 90 minutes. The solution was allowed to cool and was transferred to a plastic bottle and stored in a 0° C. freezer. The solution is predicted to be stable for greater than 5 years. The resulting solution had a concentration of 2.16 M SiO2.

General Preparation of Glass Beads

A densified oxide feedstock was prepared by co-precipitation of oxide precursors. Alkoxides or metal halide salts of the desired oxide components were mixed with an alcohol, such as methanol or ethanol, to form acidic standardized stock solutions. Predetermined amounts of the stock solutions were then combined to form a homogeneous glass bead precursor solution. Additional water may have been added to promote hydrolysis and condensation. The glass bead precursor solution may have been heated at about 50° C. for about 30 minutes to further promote hydrolysis and crosslinking of the precursor ions. The resulting acidic homogeneous solution was added with rapid stirring to an ammonium hydroxide/methanol solution to precipitate the oxides. The precipitated powders were isolated via suction filtration or rotary evaporation of the solvents. The wet powders were dried at elevated temperature, sieved to desired size (preferably<200 micrometers), heated (typically 900° C.$\leq$T$\leq$1300° C.) with a brief exposure to a chlorine source to densify and dehydroxylate the powder, and then the powder was flame formed into beads using a hydrogen/oxygen or methane/oxygen torch. The glass beads were then fractionated by the use of standard sieves.

General Procedure for Collection and Analysis of Data

Photoluminescence data were obtained using a fiber pump/collection scheme. A bead was suspended via electrostatic forces on the end of a horizontally aligned optical fiber. An x-y translator was used to manipulate the bead within close proximity of the pump fiber. Bead position was optimized for maximum fluorescence emission, which was monitored with an optical spectrum analyzer (OSA). The mounting and initial alignment operations were viewed under an optical microscope (no pump power present for safety purposes). The pump (typically 980 nm) was coupled to the bead via a wavelength division multiplexer (WDM). The light emitted in the 1450–1700 nm range was collected with the pump fiber via an OSA.

Emission decay curves were collected by pulsing the source light at ~10 Hz and monitoring the decay of the emission intensity. The emission decay curves were fit with a single, double, or triple exponential fit using standard software. From the decay curve analyses, it was possible to determine upper state lifetimes (slow, fast, and ultrafast) of the excited state electrons and the relative percentages of each. Using the McCumber theory, the absorption spectrum was predicted from the emission spectrum. The absorption spectra were then used to calculate Giles parameters, which are utilized in common models for optical amplifiers. The Giles parameters allowed for accurate composition designs for optical fiber manufacturing.

Raman Spectra

Spontaneous Raman Scattering spectra were collected using a commercial Renishaw System 1000 Raman (microRamam) instrument. Data were collected in the back-scattered mode with a 10× objective. Excitation wavelength was 782 nm.

Examples 1–6

A plurality of erbium-doped silica beads were prepared and analyzed as described below. The glass beads were analyzed and screened to investigate the effect of erbium ion concentration on the optical properties of glass beads. Silica stock solution, deionized water, and 0.1 M erbium chloride hydrate in methanol (4.06 g $ErCl_3 \cdot 7.4H_2O$ (Strem, 99.9999 percent) in 100 mL methanol) were combined in a container. The compositions are shown in Table 1 below.

TABLE 1

| Composition | Silica Stock Solution (mL) | 0.1 M Erbium Chloride (mL) | Deionized Water (mL) |
|---|---|---|---|
| 1 | 74.07 | 0.03 | 11.52 |
| 2 | 74.07 | 0.15 | 11.52 |
| 3 | 74.07 | 0.3 | 11.52 |
| 4 | 74.07 | 0.9 | 11.52 |
| 5 | 74.07 | 2.7 | 11.52 |
| 6 | 74.07 | 3.0 | 11.52 |

Compositions 1–6 were added to a mixture of methanol (250 mL) and 29 weight percent aqueous ammonium hydroxide (50 g). The resulting solutions were stirred until they gelled (about 10 seconds). The gels were isolated by suction filtration. The gels were heated at 80° C. overnight to dry the samples. The dried samples were ground with a ceramic mortar and pestle to reduce the aggregate size to less than 150 micrometers. The ground samples were transferred to alumina boats (Coors) and calcined at 1100° C. for 8 hours in static air to densify and remove all organics.

The resulting calcined powder was separated into four particle fractions: >500 micrometers, 210–510 micrometers, 50–210 micrometers, and <50 micrometers. Each particle fraction was gravity fed from a cylindrical dispenser into a hydrogen/oxygen flame. The $H_2/O_2$ ratio in the flame was 5:2. Each particle fraction was jetted by the flame onto a water-cooled aluminum incline with a collection trough at the bottom. Glass beads and un-melted particles from each fraction were collected in the trough. The glass maximize were re-melted, by passing them through the hydrogen/oxygen torch again, to maximize yield. The collected glass beads were dried in a 100° C. oven for 1 hour and fractionated with standard sieves into −150 micrometer, 150–210 micrometer, and +210 micrometer fractions. The calculated compositions of the resulting glass beads are shown in Table 2.

TABLE 2

| | Example | | | | | |
|---|---|---|---|---|---|---|
| | 1 | 2 | 3 | 4 | 5 | 6 |
| SiO2 (weight percent) | 99.995 | 99.976 | 99.952 | 99.857 | 99.667 | 99.525 |
| Er (ppm) | 15 | 75 | 150 | 450 | 1050 | 1500 |

Fluorescence spectra and lifetime data were obtained by the use of the general procedure described above. The data are shown in Table 3.

TABLE 3

| Example | FWHM (−3 dB) | Peak Emission Wavelength (nm) | Slow Lifetime (micro-seconds) | Fast Lifetime (micro-seconds) | Percent Slow Lifetime |
|---|---|---|---|---|---|
| 1 | — | — | — | — | — |
| 2 | 14.8 | 1535.7 | — | — | — |
| 3 | 15.3 | 1536.1 | — | — | — |
| 4 | 15.2 | 1535.5 | 11.1 | 2.7 | 89 |
| 5 | 17.3 | 1535.2 | 11.1 | 2.6 | 87 |
| 6 | 17.5 | 1534.4 | 11.0 | 2.8 | 85 |

These data show that rare-earth-doped silica glass beads without modifying dopants give very narrow FWHM; a red-shifted emission peak; and a relatively long erbium upper state lifetime. The data also show that an increase in concentration of erbium in silica results in a slight increase in the FWHM; a slight shift to shorter wavelength of the emission peak; and a slight decrease in percent slow (good) lifetime. It also shows that there is a minimum erbium concentration needed (about $2 \times 10^{18}$ erbium atoms per cubic centimeter) to get a discemable signal from the characterization setup.

The data illustrate that the main drawback of erbium in silica with no modifiers is the narrow FWHM (~15 nm vs ~40+nm for modified glasses), which leads to narrow amplification bandwidth in amplification devices.

Examples 7–9

Erbium-doped silica glass beads were prepared as in Example 1 with the following modifications described below in Table 4.

TABLE 4

| Composition | Silica Stock Solution (mL) | 0.1 M Erbium Chloride (mL) | Deionized Water (mL) |
|---|---|---|---|
| 7 | 79.34 | 0.3 | 14.4 |
| 8 | 79.23 | 3.0 | 14.38 |
| 9 | 78.99 | 9.0 | 14.34 |

The above compositions were precipitated with 100 g concentrated ammonium hydroxide in 500 mL methanol. Solids were isolated by evaporation of the solvent. The powders were calcined in flowing air at 650° C. for 6 hours (10° C./minute ramp rate) and then immediately heated at 10° C./minute to 1100° C. and held for 10 hours. The glass bead compositions are shown below in Table 5.

TABLE 5

| Example | SiO2 (weight percent) | Er (ppm) |
| --- | --- | --- |
| 7 | 99.952 | 150 |
| 8 | 99.667 | 1500 |
| 9 | 98.58 | 4500 |

The glass beads were analyzed and screened as described above. Fluorescence spectra and lifetime data were obtained by the use of the general procedure described above. The data are shown in Table 6 below.

TABLE 6

| Example | FWHM (−3 dB) | Peak Emission Wavelength (nm) | Lifetimes (Fast/Slow) (microseconds) | Percent Slow Lifetime |
| --- | --- | --- | --- | --- |
| 7 | 26.8 | 1534.9 | 9.7/2.2 | 81 |
| 8 | 28.9 | 1534.6 | 8.5/2.5 | 70 |
| 9 | 31.2 | 1534.5 | 71./2.1 | 62 |

Compared with the data above, these data illustrate the effect that different preparation conditions can have on optical properties. For example, the slow lifetime and the relative percentage of slow lifetime decreased as compared to samples with the same amount of erbium. The main difference in preparation procedure was in the time/temperature treatment. Examples 1–5 were calcined longer and at higher temperature than Examples 6–9.

Examples 10–14

Erbium-doped aluminosilicate glass beads of the invention were prepared and analyzed as described below. Tetraethoxysilane, methanol, and water were mixed in a container. The composition was heated at 60° C. for 1 hour 15 minutes with stirring at 200 rpm to form a clear, colorless solution. Erbium chloride hexahydrate was added then to the silica solution. Aluminum sec-butoxide and isopropyl alcohol were mixed in a separate container and allowed to stand overnight. The compositions are shown in Table 7 below.

TABLE 7

| Compositions | TEOS (mL) | Methanol (mL) | Deionized Water (g) | Erbium Chloride Hexahydrate (g) | Al(OBu$^s$)3 (g) | Isopropanol (mL) |
| --- | --- | --- | --- | --- | --- | --- |
| 10 | 22.27 | 40 | 0.36 | 0.0152 | 0.492 | 20 |
| 11 | 22.27 | 40 | 0.36 | 0.0152 | 0.984 | 40 |
| 12 | 22.27 | 40 | 0.36 | 0.0152 | 1.476 | 60 |
| 13 | 22.27 | 40 | 0.36 | 0.0152 | 1.968 | 80 |
| 14 | 22.27 | 40 | 0.36 | 0.0152 | 2.46 | 100 |

The following day, the two solutions were combined to form a slightly turbid precursor solution. The five precursor solutions were then added to mixtures of methanol and aqueous ammonium hydroxide as in Examples 1–6. Each solution was stirred and after about 20 minutes turned turbid. After 1.5 hours, the precursor solutions were opaque. The solvent in each sample was removed by evaporation, and the samples were dried at 50° C. The dried samples were heated at 750° C. for 1 hour in air, and densified at 1300° C. for 1 hour in air. The resulting powder was ground and sieved with 500, 210, and 90 micrometer standard sieves. The sieved powders were flame formed in a hydrogen/oxygen torch. For each composition, spheres were formed up to 150–170 micrometers in diameter; oblong glass beads formed up to 200 micrometers (maximum axis); and feedstock greater than 200 micrometers was mostly unmelted. All of the glass beads were re-melted to maximize melted fraction. The compositions of the glass beads of Examples 10–14 are shown in Table 8 below.

TABLE 8

| | Example | | | | |
| --- | --- | --- | --- | --- | --- |
| | 10 | 11 | 12 | 13 | 14 |
| Al/Si (mol) | 0.02:1 | 0.04:1 | 0.06:1 | 0.08:1 | 0.10:1 (0.09 +/− 0.02:1)* |
| SiO2 (weight percent) | 98.21 | 96.60 | 95.04 | 93.53 | 92.07 |
| Al (cation mole percent) | 1.96 | 3.85 | 5.66 | 7.41 | 9.09 |
| Er (ppm) | 390 | 380 | 380 | 370 | 360 |

*Scanning Electron Microscopy/Energy Dispersive X-ray Analysis measurements

Photoluminescence data were obtained as described in the general procedure above. Results are shown below in Table 9.

TABLE 9

| Example | FWHM (−3 dB) | Peak Emission Wavelength (nm) | Slow Lifetime (microseconds) | Fast Lifetime (microseconds) | Relative Percentage Slow Lifetime |
| --- | --- | --- | --- | --- | --- |
| 10 | 45.8 | 1530.4 | 10.5 | 4.5 | 94 |
| 11 | 44.7 | 1530.6 | 10.5 | 4.8 | 86 |
| 12 | 45.8 | 1530.2 | 10.5 | 4.6 | 87 |
| 13 | 46.8 | 1530.6 | 10.5 | 6.3 | 88 |
| 14 | 47.6 | 1530.6 | 10.5 | 5.3 | 75 |

These data show the effect that a modifier, such as aluminum, has on the FWHM emission peak wavelength, while maintaining a long average lifetime, and a high relative percentage of slow lifetime erbium sites. The broad emission peak is highly advantageous for amplifiers, in that more channels can be simultaneously amplified. The high percentage of long lifetime erbium indicates the possibility for highly efficient amplification.

Examples 15–17

Compositions with the following molar ratios were prepared by combining Silica Stock Solution with tetraethoxygermane and 0.1 M erbium chloride. The compositions are shown in Table 10.

TABLE 10

| Composition | Silica Stock Solution (mL) | Tetraethoxygermane (mL) | 0.1 M Erbium Chloride (mL) | 1.0 M $AlCl_3 \cdot H_2O$ in Methanol (mL) |
|---|---|---|---|---|
| 15 | 92.59 | 10.57 | 0.37 | 14.41 |
| 16 | 92.59 | 10.32 | 0.37 | 14.41 |
| 17 | 92.59 | 9.55 | 0.37 | 14.41 |

The compositions were precipitated, dried, ground, calcined at 1100° C. for 8 hours, ground again, and flame formed with a hydrogen/oxygen torch as described above. The compositions of the glass beads are shown in Table 11.

TABLE 11

| Example | $SiO_2$ (weight percent) | Ge (cation mole percent) | Er (ppm) | Al (cation mole percent) |
|---|---|---|---|---|
| 15 | 70.96 | 19.16 | 150 | — |
| 16 | 71.37 | 18.76 | 150 | 0.15 |
| 17 | 72.59 | 17.51 | 150 | 0.75 |

Photoluminescence data were then obtained as described in the general procedure above. Results are shown below in Table 12.

TABLE 12

| Example | FWHM (−3 dB) | Peak Emission Wavelength (nm) | Slow Lifetime (microseconds) | Fast Lifetime (microseconds) | Percent Slow Lifetime | Relative Percentage Slow Lifetime |
|---|---|---|---|---|---|---|
| 15 | 28.3 | 1535.1 | 11.0 | — | 100 | 100 |
| 16 | 36.0 | 1532.4 | 10.5 | 2 | 98 | 98 |
| 17 | 41.2 | 1531.6 | 10.1 | 1.2 | 98 | 98 |

The data show that at very low concentrations of modifier dopant small changes in concentrations of such ions significantly affect the FWHM of the emission spectrum and the peak emission wavelength of the glass beads. The change in FWHM was on the order of 1 nm/0.02 mole percent modifier dopant in the low concentration regime.

Examples 18–20

Examples 18 and 20 demonstrated a screening method of the invention and Example 19 provided a glass bead of the invention. Silica stock solution, absolute ethanol, deionized water, and concentrated phosphoric acid were mixed to form glass precursor compositions. The compositions are described in Table 13 below.

TABLE 13

| Composition | Silica Stock Solution (mL) | Ethanol (mL) | Deionized Water (mL) | $H_3PO_4$ (mL) |
|---|---|---|---|---|
| 18 | 44.6 | 44.6 | 5.40 | — |
| 19 | 42.4 | 41.7 | 5.13 | 0.68 |
| 20 | 40.2 | 38.8 | 4.86 | 1.36 |

The above reagents were mixed and allowed to stand overnight. The following day, the compositions were heated at 100° C. overnight. After heating, the solvent had been removed and the compositions had solidified and were in the form of large transparent glassy pieces. The solid pieces were ground, sieved, and transferred to alumina boats. The powders were heated at 10° C./minute to 350° C. for 1 hour, heated at 10° C./minute to 650° C. for 1 hour, and finally heated at 10° C./minute to 800° C. for 8 hours. After cooling, the powders were ground, sieved, and flame-formed as described above. The resulting compositions of the glass beads are shown below in Table 14.

TABLE 14

| | Example | | |
|---|---|---|---|
| | 18 | 19 | 20 |
| $SiO_2$ (weight percent) | 100 | 87.4 | 74.0 |
| P (cation mole percent) (atom percent) | — | 10.9* (13.4) | 22.9* (25.4) |

*Energy dispersive X-ray analysis

Spontaneous Raman scattering spectra were collected on Examples 18–20 using a Renishaw system 1000 Raman in the back-scattered mode with a 10× objective. The excitation wavelength was 782 nm. The relative intensity of the primary silica peak at ~465 cm$^{-1}$ (13.2 THz) increased as the phosphorous level in the glass bead was increased. A peak at ~1315 cm$^{-1}$ appeared in the glass beads that contained phosphorus. This peak was attributed to the presence of the P=O moiety in the glass beads.

Examples 21–24

Silica Stock Solutions, absolute ethanol, tetraethoxygermane, 0.07 N hydrochloric acid, and deionized water were mixed in order to form the compositions described in Table 15.

TABLE 15

| Composition | Silica Stock Solution (mL) | Tetra-ethoxygermane (mL) | Deionized Water (mL) | Ethanol (mL) | 0.07 N HCl |
|---|---|---|---|---|---|
| 21 | 74.1 | 8.92 | 15.1 | 166 | 0.024 |
| 22 | 55.6 | 17.8 | 15.8 | 147 | 0.049 |
| 23 | 37.0 | 26.8 | 16.6 | 128 | 0.073 |
| 24 | 18.5 | 35.7 | 17.3 | 108 | 0.098 |

One-half hour after adding the deionized water, the solutions were co-precipitated with 100 mL ammonium hydroxide and 500 mL methanol. The compositions were suction filtered and the resulting powders were placed in an 80° C.

drying oven overnight. The powders were ground, sieved, and heated at 950° C. for 1 hour. During the first 10 minutes of heating the powders at 950° C., chlorine gas and air were introduced into the tube furnace and over the powders to dehydroxylate the powders. During the last 50 minutes of heating, only air flowed over the powders. The fired powders were ground and sieved and flame-formed as described above. Portions of the powders were also flame formed in a methane/oxygen flame. The glass bead compositions are shown in Table 16 below.

TABLE 16

| Component | 21 | 22 | 23 | 24 |
|---|---|---|---|---|
| $SiO_2$ (weight percent) | 70 | 46 | 28 | 13 |
| $GeO_2$ (weight percent) | 30 | 54 | 72 | 87 |

The data show that Examples 21–24 are Raman active and photosensitive. Examples 21–24 provided Raman shifts at 465 $cm^{-1}$ to +420 $cm^{-1}$ and are characteristic of a convolution of amorphous silica and amorphous germania.

All patents, patent applications, and publications cited herein are each incorporated by reference, as if individually incorporated. The various modifications and alterations of this invention will be apparent to those skilled in the art without departing from the scope and spirit of this invention. This invention should not be restricted to that set forth herein for illustrative purposes.

What is claimed is:

1. A photosensitive solid glass bead for use in optical applications comprising a mixture of:

greater than 80 weight percent silica and geanania combined; and at least 5 weight percent germania.

2. The photosensitive solid glass bead according to claim 1 further comprising a modifying dopant.

3. The photosensitive solid glass bead according to claim 1 wherein the silica is present in an amount of from about 60 to about 95 weight percent.

4. The photosensitive solid glass bead according to claim 1 wherein the germania is present in an amount of from about 5 to about 40 weight percent.

* * * * *

UNITED STATES PATENT AND TRADEMARK OFFICE
CERTIFICATE OF CORRECTION

PATENT NO. : 6,914,024 B2
APPLICATION NO. : 10/837020
DATED : July 5, 2005
INVENTOR(S) : Mark T. Anderson Page 1 of 1

It is certified that error appears in the above-identified patent and that said Letters Patent is hereby corrected as shown below:

Column 11,
Line 67, delete "maximize" and insert in place thereof -- beads --.

Column 12,
Line 44, delete "discemable" and insert in place thereof -- discernable --.

Column 13,
Line 63, delete "precusor" and insert in place thereof -- precursor --.

Column 18,
Line 12, delete "geanania" and insert in place thereof -- germania --.

Signed and Sealed this

Thirteenth Day of March, 2007

JON W. DUDAS
*Director of the United States Patent and Trademark Office*